United States Patent [19]

Reck

[11] Patent Number: 4,758,007
[45] Date of Patent: Jul. 19, 1988

[54] SHOPPING CART STEPLADDER

[76] Inventor: Edward W. Reck, 20 Quail Run, Plant City, Fla. 33566

[21] Appl. No.: 1,838

[22] Filed: Jan. 9, 1987

[51] Int. Cl.⁴ .............................................. B62B 3/02
[52] U.S. Cl. ........................ 280/33.99 A; 280/47.35; 280/163; 182/127
[58] Field of Search ................ 280/33.99 R, 33.99 A, 280/33.99 S, 47.34, 79.1 R, 164 R, 163, 47.35; 182/90, 92, 127, 222, 206, 106

[56] References Cited

U.S. PATENT DOCUMENTS

| D. 172,126 | 5/1954 | Conhaim | 182/106 |
|---|---|---|---|
| 381,429 | 4/1888 | Scott | 182/222 |
| 675,545 | 6/1901 | Hatch | 182/206 |
| 3,120,290 | 2/1964 | Kamrath | 182/206 |
| 3,647,023 | 3/1972 | Bedford, Jr. | 182/106 X |
| 3,702,018 | 11/1972 | Wood | 280/33.99 A X |
| 3,743,051 | 7/1973 | Cramer | 182/106 X |
| 3,834,726 | 9/1974 | Hobza | 280/33.99 A X |
| 3,884,327 | 5/1975 | Zigman | 182/106 X |
| 4,376,502 | 3/1983 | Cohen | 280/33.99 A X |
| 4,504,073 | 3/1985 | Isaacs | 280/33.99 A X |
| 4,610,454 | 9/1986 | Gill | 280/33.99 A |
| 4,652,003 | 3/1987 | Karashima | 182/127 |

FOREIGN PATENT DOCUMENTS 3335238A 5/1984 Fed. Rep. of Germany.

Primary Examiner—David M. Mitchell
Assistant Examiner—Tamara L. Finlay

[57] ABSTRACT

A ladder for detachable carriage on a shopping cart gives store customers access throughout the store to shelves that are too high for some people to reach standing on the floor. The ladder has a frame with a loop handle extending up from steps for customers to hold when climbing onto or standing on the steps, and legs with non-skid feet. For carriage, the steps, legs and feet can fit in a nominal size space between basket and castor-mounting lower frame of a common shopping cart with the ladder retained by adjustable-height hook structure on the loop handle engaging the upper edge of the basket. To get the steps out from below the basket for carrying on the them additional loads or on the cart beneath the baskets, the hook structure can engage the top of the basket with the steps oriented to the front of the shopping cart.

1 Claim, 2 Drawing Sheets

SHOPPING CART STEPLADDER

FIELD OF THE INVENTION

This invention relates generally to land vehicles and particularly to a ladder system for improving utilization of shopping carts and shelf space in stores and the like.

BACKGROUND OF THE INVENTION

Body support mechanism in association with shopping carts has been disclosed, as in the following U.S. Pat. Nos.:

3,834,726 to M. J. Holza, 9-10-74, showed a step-on trailer with wheels and connection for attachment behind a shopping cart;

4,504,073 to H. Isaacs, 3-12-85, showed a cart with an attached stool at the handle end. The stool evidently could be detached.

SUMMARY OF THE INVENTION

Many people cannot reach the top shelf items in supermarkets and the like, whether because they are not tall enough, because of arthritic conditions or other physical reasons. Three choices may be available in such situations: to ask for help or to buy substitute goods, if available on lower shelves, or not to buy, none of which is to the benefit of seller or buyer. Ladders are not usually available in the aisles of stores.

The present inventor has provided a convenient solution to the problem, according to objects of this invention, in the form of a safe, lightweight and easily used ladder as part of a system with the commonest form of shopping cart to increase customer satisfaction and store efficiency.

Further objects are to provide a system as described that is useful not only to customers but also to people stocking shelves of a store or a library or similar situation.

Yet further objects are to provide a system as described that is stable, light weight, that takes up no basket space and can leave the below-basket space clear also, if desired, and even provides additional carrying space in one mode of operation.

Still further objects are to provide a system as described that has adjustment to fit most shopping carts and that provides a handle usable as a push-handle to propel and guide a shopping cart in reverse direction.

Yet further objects are to provide a system as described that is durable, practical, economical, takes up a minimum of space when stored, can be attached and detached instantly, and can be loaned among shopping cart users in the aisles without trouble or delay, so that not all shopping carts in a store would need to be provided with the invention, prompting economy and higher use-time, and making impulse buying easier.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION

Figure 1:
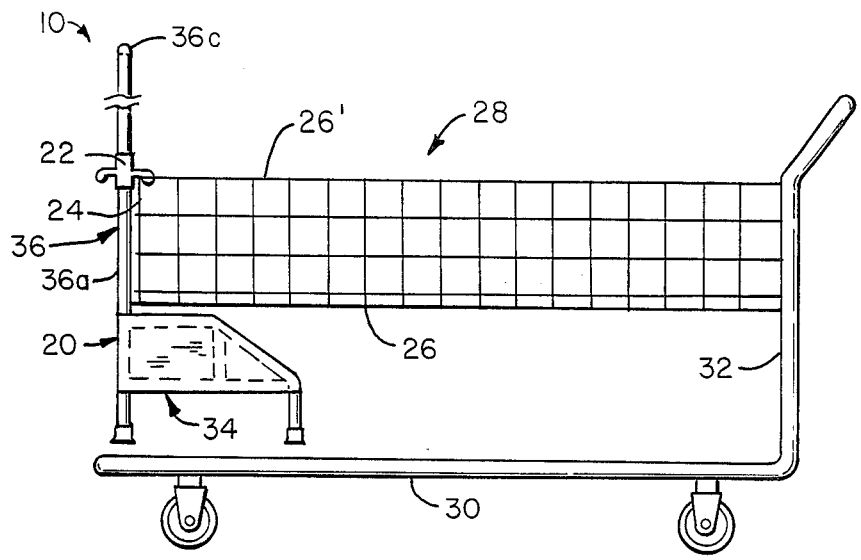
FIG. 1 is a side elevational view partly broken away for exposition of the preferred embodiment of the invention in a first mode of adjustment.

FIG. 1 shows a system in embodiment 10 of the invention, a ladder 20 hanging by a hook 22 from the front end 24 of a container or basket 26 of a shopping cart 28.

The shopping cart 28 is of the type having the basket-like container 26 supported in spaced relation above a wheeled portion 30 beneath the container by any conventional connection with upward extension 32 of the wheeled portion rearwardly of the container.

The ladder 20 has a stepped part 34 at a first end, proportioned for fitting freely between the container 26 and the wheeled portion 30 below it.

A handle 36 at the second end of the ladder extends substantially straight up past at least a part of the container or basket 26, preserving compactness at the front of the shopping cart. The handle preferably is in the form of an inverted "U", having two upright portions 36a, 36b joined by a horizontal portion 36c, across the top, (36b appears in FIG. 2).

A respective hook 22 (23 shown in next Figure), slidably adjustable up and down each upright handle portion could hook onto the mesh somewhere along an openwork basket and suspend the ladder, not requiring the handle 36 to extend up past the basket, for this purpose (but still for support).

However, for several reasons the handle 36 in the preferred embodiment extends up past the top rim 26' of the basket and the hooks engage by the adjustment provided, the top rim of the basket. The top of the basket is stronger, usually being reinforced, and the upwardly extending handle provides a grip clear of the basket for lifting and hooking the ladder, or for releasing it. Solid wall or small mesh size is not a problem in hooking the top of the basket. A relatively high handle lets the user hold-on while stepping up on the step part. Re-engagement of the hooks with the basket rim 26' can be seen more easily. And the part of the handle extending above the basket rim can be used as a supplemental cart-handle for propelling and guiding the basket in reverse, when useful or necessary.

With the step part 34 of the ladder suspended beneath the basket, it can be seen that the front of the shopping cart is substantially free of obstruction by the ladder, and the steppart is out of the way, being by design narrower than the ordinary shopping cart shown, with which the ladder embodiment is intended for use. Nominal width for such shopping carts may be 18 to 24 inches (46 to 62 cm).

Detaching the ladder 20 from the shopping cart may be done in very crowded quarters, as in a jammed aisle, because it only needs to be lifted slightly to unhook it and can then be moved forward or to either side to free the step portion from beneath the basket in preparation for setting it on the floor and stepping up on it, stabilized by holding the handle 36.

Figure 2:
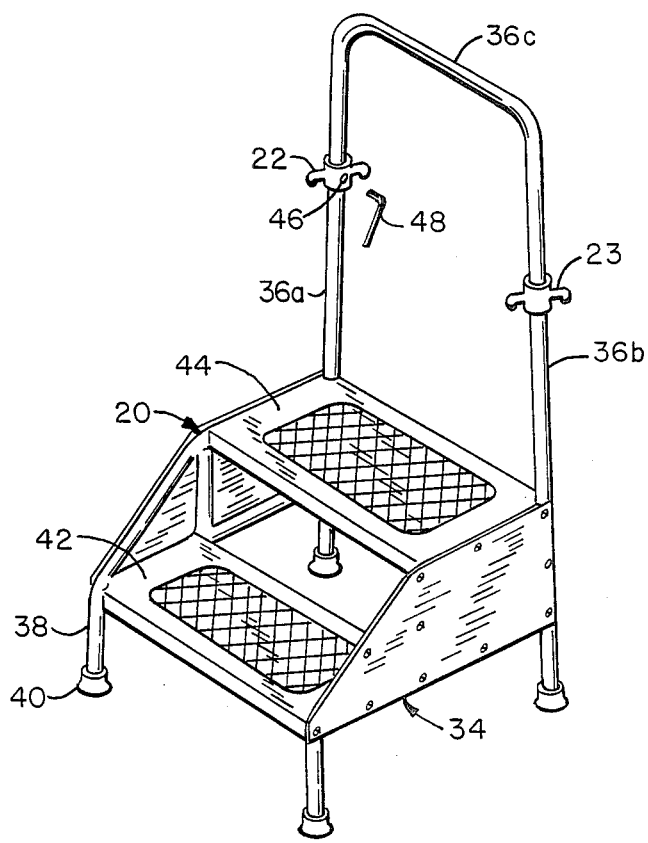
FIG. 2 is a perspective view of a ladder portion of the system of the invention.

FIG. 2 shows a representative form of usuable ladder 20. Legs 38 with rubber feet 40 are preferred. Four-inch (10 cm) steps 42, 44 are preferred. Handle height of about 42 inches (106 cm) is preferred. No claim is made to a specific form of hook. For example, double, opposed hooks 22, 23 as shown or single hooks that can rotate on the handle to provide for forward-facing of the stepped part 34 or for a rearward-facing of it, may be used. Adjustment might normally be made by supermarket managers to suit the shopping carts used. Allen screws 46 for clamping by Allen wrenches 48 may be used.

Figure 3:
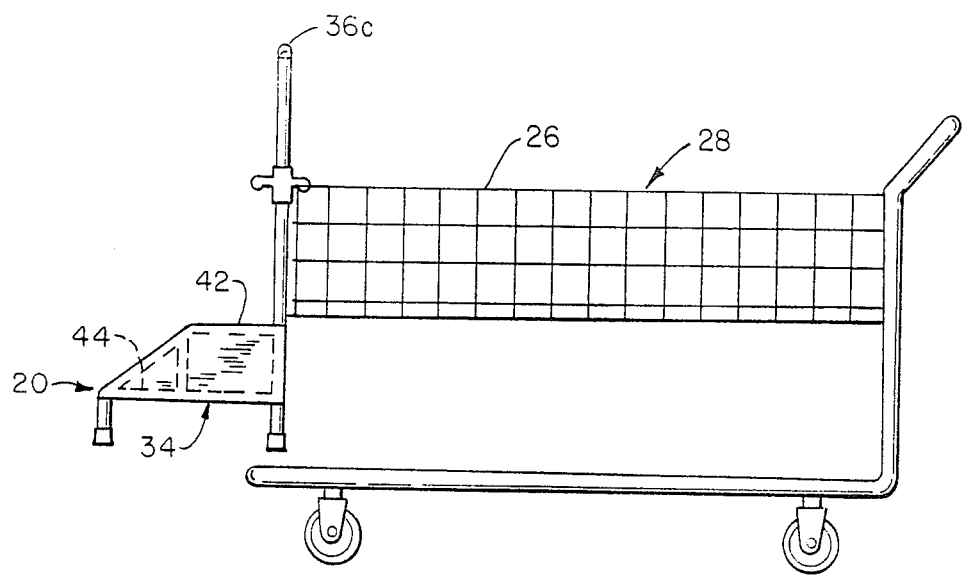
FIG. 3 is a side elevational view in a second mode of adjustment.

FIG. 3 shows the ladder 20 oriented to the front of the shopping cart 28 where it is hung as before, but with the stepped part 34 extending forwardly from the shopping cart.

The steps 42, 44 can be used for extra carrying capacity and the space beneath the basket 26 is clear.

Figure 4:
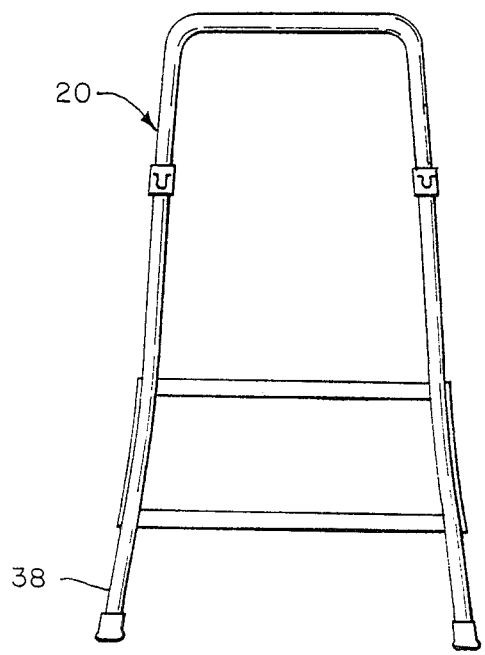
FIG. 4 is an end elevational view of a ladder portion of the invention.

FIG. 4 shows preferred shape of the ladder 20 more clearly. The legs 38 may be conventionally splayed to permit stacking ladders in minimum space when shipped or when otherwise not in use.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Letters Patent is:

1. A shopping cart ladder system for enabling people to step up and reach higher shelves in stores and the like than they could when standing on the floor, characterized by a shopping cart of the type with forward and rearward end and having a basket-like open-top container supported in spaced relation from a wheeled portion beneath the container by a connection extending from the wheeled portion upwardly to the container at the rear; a ladder with a stepped part, the stepped part proportioned for fitting freely between the container and the wheeled portion beneath, a handle on the ladder, the handle having a part thereof proportioned for extending up past at least a part of the container, means on the handle for detachably engaging a selected portion of the container and supporting said ladder on the container with the stepped part extending rearwardly between the container and the wheeled portion and means for providing extra carrying capacity for the system comprising said means for detachably engaging providing for the container alternatively to support said ladder with the stepped part extending forwardly from the shopping cart, said means on the handle for detachably engaging including means on the handle for hooking a selected portion of the container, said selected portion of the container being a rim at the top thereof, means for adjusting height of the means for hooking for engaging said rim, means for stabilizing said ladder when engaging said shopping cart comprising said handle having "U"-shape, and said means for hooking comprising a hook on each arm of said "U"-shape.

* * * * *